United States Patent Office 3,491,814
Patented Jan. 27, 1970

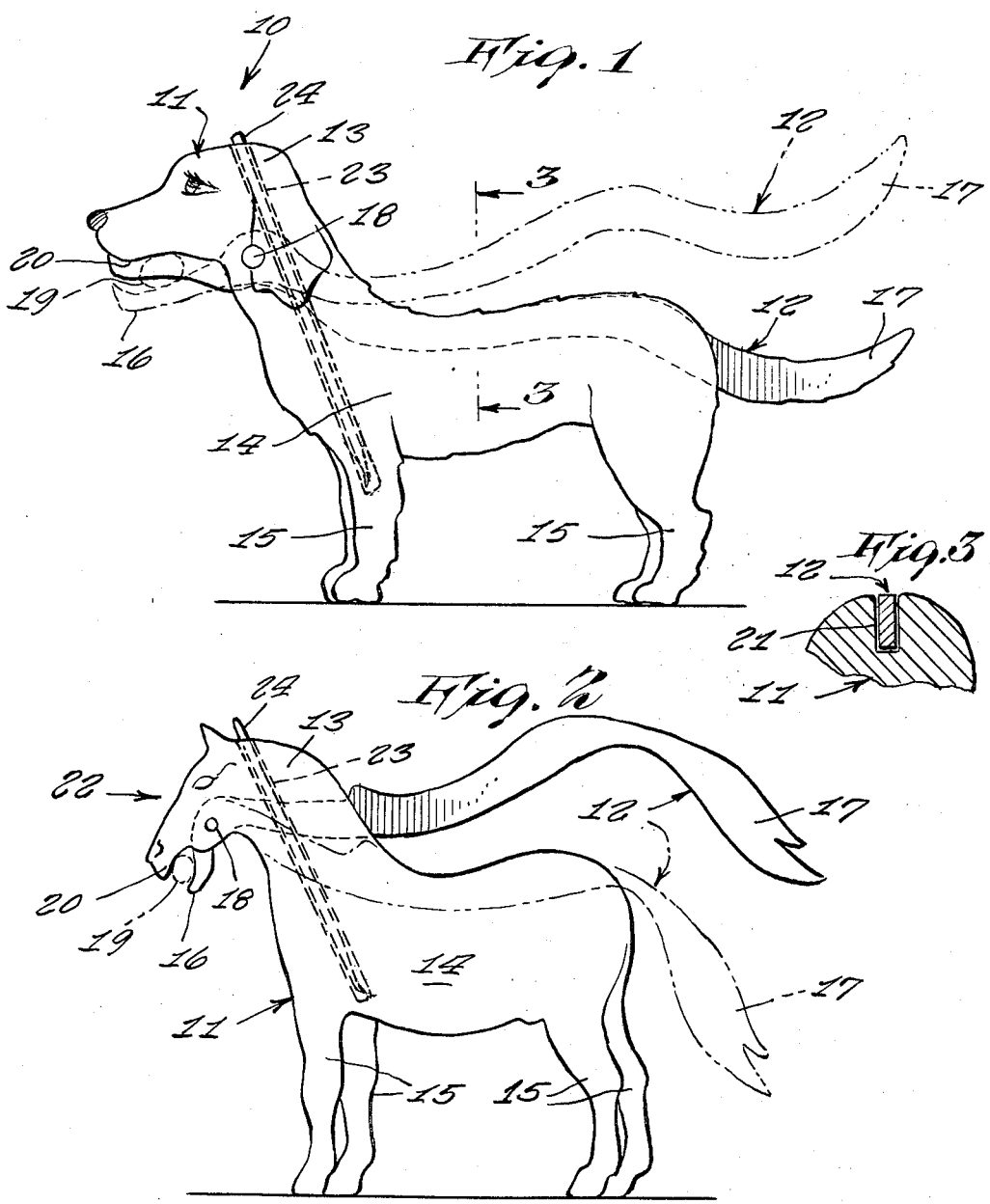

3,491,814
NUT CRACKER
Anna T. Marcinek and Helen M. Marcinek, both of
4930 W. Newport Ave., Chicago, Ill. 60641
Filed Jan. 9, 1967, Ser. No. 608,145
Int. Cl. A23n 5/00; A47j 43/26
U.S. Cl. 146—13    1 Claim

ABSTRACT OF THE DISCLOSURE

A nut cracker in the shape of an animal such as a dog, the nut cracker being comprised of a pair of pivotable levers, one of the levers comprising the stationary body of the animal and the other lever comprising the jaw of the animal at one end and a tail at the opposite end, the tail being manually pivotable so as to bring the jaw against the underside of the animal head so as to crack a nut positioned therebetween, and the stationary lever comprising the animal body having a pick opening extending through the head downwardly at a slight angle toward the rear so as to allow removal of a pick from the upper end thereof in a slightly forward direction.

This invention relates generally to devices for cracking nuts. More specifically it relates to nut crackers that are manually operated within a person's hand for cracking nuts one at a time.

A principal object of the present invention is to provide a novel nut cracker for breaking the shell of nuts so to permit access to the nut meats contained within the nut shell. Another object of the present invention is to provide a novel nut cracker which is designed to represent an animal in configuration for amusement purposes.

Yet another object of the present invention is to provide a novel nut cracker designed to represent an animal and wherein the nut is placed within the mouth of the animal and wherein downward pressure against the tail of the animal will cause the lower jaw of the animal to bear pressure against the nut within the animal's mouth, thereby causing the nut shell to be cracked.

Yet another object of the present invention is to provide a novel nut cracker wherein the animal representation may be a dog, a horse or any other animal that incorporates a lower jaw and a tail.

Other objects of the present invention are to provide a novel nut cracker which is simple in design, inexpensive to manufacture, rugged in construction, easy to use and efficient in operation.

These and other objects will be readily evident upon a study of the following specification and the accompanying drawing wherein:

FIGURE 1 is a side elevation view of a nut cracker incorporating the persent invention and wherein the nut cracker is designed in the form of a dog, FIGURE 2 is a side elevation view of a modified design of the present invention wherein the animal representation comprises a horse, and FIGURE 3 is a cross-sectional view taken on the line 3—3 of FIGURE 1.

Referring now to the drawing in detail the reference numeral 10 represents a nut cracker according to the present invention wherein there is a stationary body 11 and a pivotable lever 12.

The stationary body, illustrated in FIGURE 1 of the drawing, shows a representation of a dog and includes a head 13, a torso 14 and legs 15.

The pivotable lever 12 comprises a singular member of elongated configuration and which at one end is configurated to represent a lower jaw 16, and which at its opposite end is configurated to represent a tail 17. The pivotable lever is mounted pivotably free between its opposite ends on a pin 18 retained within the stationary body. The pivotable lever 12 is moveable pivotably between the positions shown by the phantom lines and the solid lines in FIGURE 1 so as to permit placement of a nut 19 between the lower jaw 16 and the lower side 20 of the head 13. A slot 21 is formed along the back of the animal representation and into which the pivotable lever is received when in an inoperative position so that the lever assumes a proper position to represent a life-like animal.

In FIGURE 2 of the drawing the nut cracker assumes the representation of a horse 22 and wherein the construction is the same as for the dog representation shown in FIGURE 1 of the drawing, and wherein like parts are represented with like reference numerals.

In operative use, the pivotable lever 12 is grasped by the tail portion 17 which is then raised upwardly so that the jaw 16 is lowered thereby opening up the mouth of the animal sufficiently so as to introduce a nut 19 into the mouth. The tail is then depressed downwardly to cause the lower jaw to be raised upwardly and crush the nut 19 held within the mouth of the animal. The tail is then again slightly raised so as to free the cracked nut from the animal mouth and permit the same to be taken therefrom so that the nut meats may be removed from the nut shell.

It is to be noted that the pivot pin 18 is relatively closer to the jaw than to the tail thereby providing leverage so that the nuts may be cracked with relatively small effort by the operator.

An opening 23 may be also provided in the device for purpose of storing a nut picker 24, therein. The end of the picker may be conveniently grasped between the fingers and lifted out of the opening 23 when it is desired to pick nut meats out of the nut shell.

While various changes may be made in the detailed construction it is understood that such changes will be within the spirit and scope of the present invention as is defined by the appended claim.

We claim:

1. In a nut cracker, the combination of a stationary member and a pivotable member, said stationary member comprising the representation of the body of an animal, the pivotable member comprising the representation of a tail and jaw of said animal, said pivotable member being pivotably secured to said stationary body, said stationary body comprising the representation of said animal including a head, a torso, and a plurality of legs, the under side of said head comprising one surface against which a nut to be cracked will bear during nut cracking operation, said pivotable lever having said jaw representation at one end and said tail representation at the opposite end thereof, said pivotable lever being pivotable between its opposite ends upon a pin carried within said stationary body, said pin engaging said lever relatively closer to said jaw representation than to said tail representation so to provide increased leverage, said stationary body including a longitudinally extending recess along the back of said body, the central portion of said pivotable lever being received within said recess when said nut cracker is in an inoperative position so that said pivotable lever assumes a position to represent the normal appearance of an animal and said stationary body including a generally vertical opening serving as a pocket receiving a removable nut pick, said vertical opening extending generally vertically through said head and at a slight angle diagonally downwardly and rearwardly so that said nut pick is inclined forwardly during removal therefrom, and said removable nut pick having an upper end thereof extending a short distance outwardly of said pocket so to permit convenient grasp thereof between a person's fingers so to extract the same outwardly therefrom.

References Cited

UNITED STATES PATENTS

| | | | |
|---|---|---|---|
| 417,951 | 12/1889 | Story | 146—13 |
| 660,033 | 10/1900 | Sedgwick | 146—13 |
| 1,030,805 | 6/1912 | Carlsen | 146—13 |
| 2,949,950 | 8/1960 | Gore | 146—13 |

JAMES M. MEISTER, Primary Examiner